(12) United States Patent
Borelli

(10) Patent No.: US 12,404,062 B2
(45) Date of Patent: Sep. 2, 2025

(54) METHOD FOR DETECTING AND TRACKING A FEATURE OF A WEB OF PACKAGING MATERIAL

(71) Applicant: Tetra Laval Holdings & Finance S.A., Pully (CH)

(72) Inventor: Gabriele Borelli, Spilamberto (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 21 days.

(21) Appl. No.: 18/254,570

(22) PCT Filed: Nov. 25, 2021

(86) PCT No.: PCT/EP2021/082958
§ 371 (c)(1),
(2) Date: May 25, 2023

(87) PCT Pub. No.: WO2022/117425
PCT Pub. Date: Jun. 9, 2022

(65) Prior Publication Data
US 2024/0017867 A1    Jan. 18, 2024

(30) Foreign Application Priority Data
Dec. 1, 2020  (EP) ................................ 20210988

(51) Int. Cl.
*B65B 57/02*  (2006.01)
*B65B 9/08*   (2012.01)
(Continued)

(52) U.S. Cl.
CPC ............ *B65B 57/02* (2013.01); *B65B 9/08* (2013.01); *B65B 51/30* (2013.01); *B65H 26/02* (2013.01);
(Continued)

(58) Field of Classification Search
None
See application file for complete search history.

(56) References Cited

U.S. PATENT DOCUMENTS 3,519,922 A * 7/1970 Hick .............. G01B 7/125
                                               162/263
4,276,547 A * 6/1981 Bowen ............ G01N 27/24
                                               200/61.18
(Continued)

FOREIGN PATENT DOCUMENTS

| CN | 1489546 A   | 4/2004 |
| CN | 101115661 A | 1/2008 |

(Continued)

OTHER PUBLICATIONS

International Search Report and Written Opinion received in PCT Application No. PCT/EP2021/082958 as mailed Mar. 7, 2022 in 8 pages.

*Primary Examiner* — Tanzim Imam
(74) *Attorney, Agent, or Firm* — Knobbe Martens Olson & Bear LLP

(57) ABSTRACT

A method (600) for detecting and tracking a feature of a web of packaging material (102), using a first capacitor (106) placed at a distance (d) from the web of packaging material (102) is provided. The method (600) comprises; feeding (602) a section of the web of packaging material (102) to a first position (p), so that the section influences a dielectric property of the first capacitor (106), measuring (604), at a point of time (t), a capacitance of the first capacitor (106), and determining (612) the feature of the section passing the first capacitor (106) at the point of time (t), based on the capacitance.

14 Claims, 8 Drawing Sheets

(51) Int. Cl.
  *B65B 51/30*  (2006.01)
  *B65H 26/02*  (2006.01)
  *G01B 7/06*  (2006.01)

(52) U.S. Cl.
  CPC .. *G01B 7/087* (2013.01); *B65H 2301/460186* (2013.01); *B65H 2511/13* (2013.01); *B65H 2515/70* (2013.01); *B65H 2553/23* (2013.01)

(56) References Cited

U.S. PATENT DOCUMENTS

2018/0111711 A1* 4/2018 Takayama ............... B65B 57/00
2020/0400420 A1* 12/2020 Cummer ............... B60R 16/023

FOREIGN PATENT DOCUMENTS

| CN | 103968749 A | 8/2014 | |
| CN | 203811121 U | 9/2014 | |
| CN | 204400259 U | 6/2015 | |
| CN | 106501340 A | 3/2017 | |
| DE | 20107366 U1 * | 8/2001 | ............ B65B 41/18 |
| EP | 2174899 A1 | 4/2010 | |

* cited by examiner

METHOD FOR DETECTING AND TRACKING A FEATURE OF A WEB OF PACKAGING MATERIAL

TECHNICAL FIELD

The invention relates to packaging technology. More particularly, it is related to a method for detecting and tracking features of a web of packaging material.

BACKGROUND ART

Today, within the food industry, roll-fed packaging machines are commonly used for producing food products. In such machines, the packaging material for the packages is provided on reels of packaging material. By unwinding the reel, a web of packaging material is formed and fed into the machine, where it is, in turn, formed, filled with product and made into individual packages.

To be able to provide continuous production a so-called automatic splicing unit (ASU) can be used. By using the ASU, when replacing a first reel with a second reel, the web formed from the first reel can be joined to the web from the second reel, and in such way avoid a need to stop production because the first reel needs to be replaced by the second reel. An attachment section between the two webs are sometimes referred to as an ASU splice or only a splice.

Since the individual packages comprising the ASU splice should be discarded. Systems for detecting such splices on the web of packaging material are often incorporated in the packaging machines.

A current solution of detecting the splice, deployed in many roll-fed packaging machines employs a bearing that is rotating on the packaging material and a lever system that is maintaining the bearing in position. Whenever the bearing is passing on the splice, it moves up or down. This movement can be amplified by the lever system and hence the presence of the splice can be detected.

Even though there are solutions available, there is a need for improved solutions that can even better detect the splices and other similar features of the web in a reliable and cost-efficient manner.

SUMMARY

It is an object of the invention to at least partly overcome one or more of the above-identified limitations of the prior art. In particular, it is an object to provide an improved method for detecting and tracking a feature of a web of packaging material.

It has been realized that by relying on the dielectric properties of the web of packaging material, an improved method for detecting features, such as splices, can be achieved. The features may be detected by identifying a change in capacitance of a capacitor, in which the web forms part, and based on this change the features can be detected.

According to a first aspect, it is provided a method for detecting and/or tracking a feature of a web of packaging material using a first capacitor placed at a distance (d) from the web of packaging material. The method comprises;

feeding a section of the web of packaging material to a first position (p), so that the section influences a dielectric property of the first capacitor, measuring, at a point of time (t), a capacitance of the first capacitor, and determining the feature of the section passing the first capacitor at the point of time (t), based on the capacitance.

The packaging material may be made of multiple layers. The packaging material may comprise a paper board layer. Further, the packaging material may comprise a metallic layer, such as an Aluminium foil.

The term feature may refer to an anomaly in the packaging material of the web. The presence of the feature may be relevant to detect and track through a production line in order to optimize or alter the process.

The step of measuring the capacitance may comprise injecting a known amount of charges to the first capacitor and measuring the voltage over two plates of the first capacitor.

The step of determining the feature may comprise determining if the feature is present in the section of the web of packaging material. Put differently, the step of determining the feature may be to determine if one of a number of pre-set features is present in the section of the web of packaging material. In addition, the step of determining the feature may comprise determining which feature of the number of pre-set features is present in the section.

The section of the web of packaging material may refer to a part of the web that influences the dielectric medium of the first capacitor. Subsequent sections may partly overlap previous sections. The amount of overlap may be dependent on the speed of the web of packaging material, and the time interval of the capacitance measurements.

An advantage of the proposed method may be that the feature can be detected without making physical contact with the web of packaging material. This may be advantageous from a food safety perspective, since sterilization of the packaging material is crucial. Further, the capacitor requires no line of sight, as opposed to a camera-based system. An effect of this is in turn that it can be protected by a housing, coating or similar, such as a solid resin deposition. Since milk or other food products and/or steam may present, this may prove advantageous in terms of operational reliability.

The proposed method further proves advantageous in that it lacks any moving parts, as opposed to the solution with a lever and bearing. Thus, it provides a more reliable solution, and less prone to give false detections.

Further, an effect of not requiring contact with the web is that the décor, i.e. printing of the web, is not negatively affected.

The method may further comprise measuring, at the point of time (t), a capacitance of a second capacitor at a second position (p'), wherein the second position (p') may be located downstream the first position (p). Further, the method may comprise determining a differential capacitance as a difference between the capacitance of the first capacitor, and the capacitance of the second capacitor. The step of determining the feature of the section passing the first capacitor at the point of time (t), may be based on the differential capacitance.

The step of measuring the capacitance of the second capacitor may comprise injecting a known amount of charges to the second capacitor and measuring the voltage over two plates of the second capacitor.

The term downstream should be interpreted in relation to the direction of the web of packaging material. Put differently, a section of the web of packaging material reaches first the first position (p) and then the second position (p').

The second capacitor may be placed at a separational distance (d') from the first capacitor. The separational distance (d') may be such that a feature may be present at the first position (p) without at the same time being present at the second position (p').

An advantage of using a differential measurement of the capacitance may be that noise from the measurements can be removed.

A first capacitor plate of the first capacitor may be connected to a second capacitor plate of the second capacitor. Put differently, the first and second capacitor may be interconnected. This may ensure that the first and second capacitor is excited with the same amount of charges, which may be advantageous when measuring the differential capacitance. Further, it can simplify the construction of the circuit board since one less connector is needed, and they can be excited by the same device. Even further, having the interconnected pair of capacitors may be advantageous in that the measurement of the capacitances can be performed simultaneously.

A roller of the roll-fed packaging machine may be placed opposite to the first capacitor and the step of measuring the capacitance may be performed with the web being in contact with the roller. Put differently, the step of measuring the capacitance may be performed with the first position (p) at a roller of a roll fed packaging machine. It may also be placed just before or just after the roller. In other words, the first capacitor is placed in this region. An advantage of measuring the capacitance in this region may be that oscillations in the web of packaging material is typically smaller in this region and higher further away from the roller.

The method may further comprise tracking the feature, using the point of time (t) of the measurement, and adapting settings of a device of the roll fed packaging machine based on the presence of the feature. Put differently, by knowing when and where the feature has been detected, the feature can be tracked throughout the processing line. This may for instance be advantageous when settings of a device in the packaging machine needs to be adapted if the feature is present.

The term "device" may herein be interpreted as a subsystem of the roll fed packaging machine. As a non-limiting example, it may be a system for sterilizing the packaging material, sealing the package or filling the package with product.

The method may further comprise determining oscillations in the web affecting the distance (d) between the capacitor and the web. Further, the step of determining the feature may comprise compensating for the oscillations. This may be advantageous in that a more precise determination of the feature may be achieved. In addition, abnormal oscillations in the web may be detected that could indicate that something is wrong within the packaging machine.

The oscillations may be determined by another part of the machine and these may be taken into account when determining the feature. Another option is that the first capacitor can in itself determine the oscillations by detecting regular variations in capacitance that are likely to be a result of variations in distance.

The distance (d) between the capacitor and the web of packaging material may be 2-5 mm.

The capacitor may be a planar capacitor. This may be an advantage in that the capacitor can be placed on one side of the web of packaging material, as opposed to having the web of packaging material passing through the capacitor. This reduces the complexity and the risk of having the web of packaging material getting stuck in the capacitor.

The feature may be related to a thickness of the web of packaging material. Put differently, it may be related to a change in thickness of the web of packaging material.

The feature may be a splice between two ends of packaging material. The splice may come from joining a new roll of packaging material with a roll that is about to finish. It may also come from a doctoring of a web of packaging material, when a part of the web has been removed.

The splice should be understood to have a greater thickness, due to overlapping packaging material, that other parts of the web.

Alternatively, the feature may be an area where material has been added to or removed from the web of packaging material. Such a feature may be a pre-laminated hole, PLH, where one or more layers of the packaging material has been removed.

According to a second aspect, an arrangement for detecting and tracking a feature of a web of packaging material in a roll fed packaging machine is provided. The arrangement comprises;
   a first capacitor,
   a capacitor measurement unit,
   a control unit comprising a processor and a memory, communicatively connected to the capacitor, wherein the control unit is configured to;
   send a request to the capacitance measurement unit to inject a known amount of charges to the first capacitor placed at a distance (d) from the web of packaging material,
   receive indication that a section of the web of packaging material has been fed to a first position (p), so that the section influences a dielectric property of the first capacitor,
   measure, by the capacitor measurement unit, at a point of time (t), a capacitance of the first capacitor, and
   determine the feature of the section passing the first capacitor at the point of time (t), based on the capacitance.

The arrangement may further comprise a second capacitor, and the control unit may further be configured to;
   measure, by the capacitor measurement unit, at the point of time (t), a capacitance of the second capacitor at a second position (p'), wherein the second position (p') may be located upstream from the first position (p),
   determine a differential capacitance as a difference between the capacitance of the first capacitor, and the capacitance of the second capacitor,
   wherein the step of determining the feature of the section passing the first capacitor at the point of time (t), may be based on the differential capacitance.

According to a third aspect, a roll fed packaging machine is provided. The roll fed packaging machine may be enabled for detecting and tracking a feature of a web of packaging material. The roll fed packaging machine comprises;
   a reel receiver for receiving a roll of packaging material,
   a longitudinal sealing device for forming a tube of the web of packaging material,
   a product filling pipe for filling product into the tube,
   a transversal sealing device for forming packages, filled with the product, from the tube,
   an arrangement for detecting and tracking a feature of a web of packaging material in a roll fed packaging machine, according to the second aspect.

The roll fed packaging machine may further comprise a discarding unit. The discarding unit may be configured to discard packages.

The control unit may be communicatively connected to a control system of the roll fed packaging machine such that the feature can be tracked throughout the roll-fed packaging machine. The control system of the roll fed packaging machine may be configured to adapt settings of one or more devices of the roll fed packaging machine based on the feature being tracked.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which.

The figures should not be considered limiting; instead they are used for explaining and understanding.

DETAILED DESCRIPTION

The present invention will now be described more fully hereinafter with reference to the accompanying drawings. This invention may, however, be embodied in many different forms and should not be construed as limited to the embodiments set forth herein; rather, these embodiments are provided for thoroughness and completeness, and to fully convey the scope of the invention to the skilled person.

Figure 1:
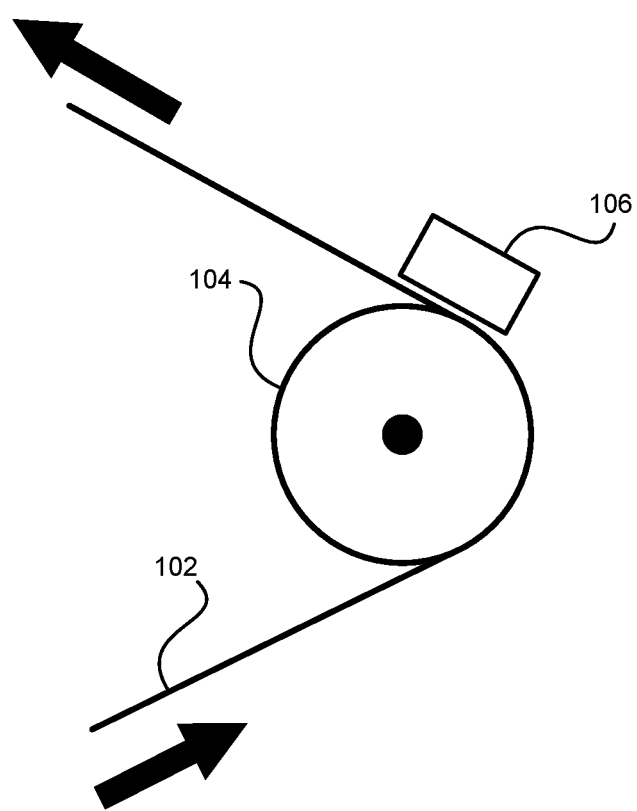
FIG. 1 is a cross sectional view of a placement of a capacitor.

FIG. 1 illustrates a placement of a capacitor 106 in relation to a web of packaging material 102. When measuring a capacitance of the capacitor 106 to detect a feature of the web of packaging material 102, a suitable placement of the capacitor 106 may be in connection to a roller 104. In this region, vibrations or oscillations of the web 102 are smaller than for instance in between two rollers. The capacitor may be curved with the same diameter as the roller 104, so that it can be placed along the bend where the web of packaging material 102 is in contact with the roller 104. The arrows indicate the moving direction of the web of packaging material.

Figure 2A:
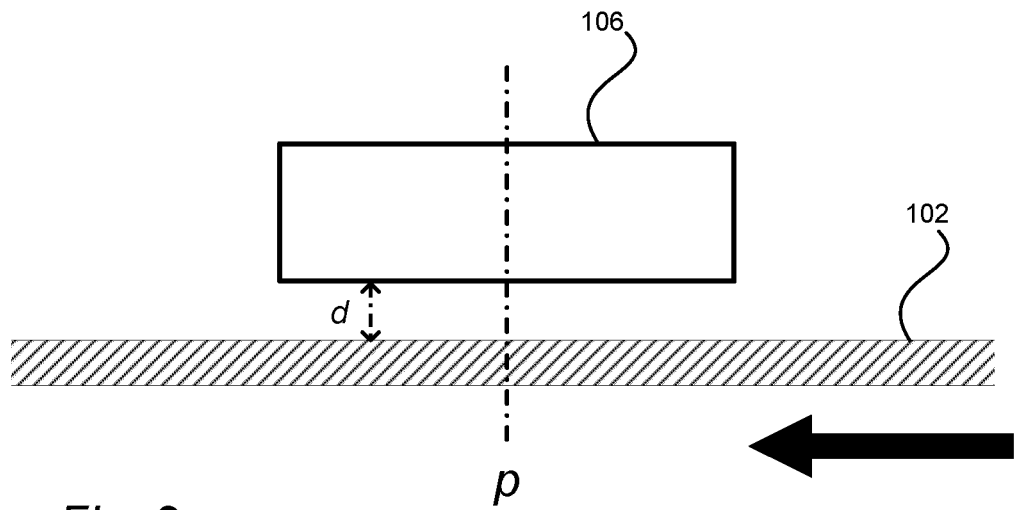
FIGS. 2a and 2b illustrates two different scenarios for a capacitor placed close to a web of packaging material.

FIG. 2a illustrates, in a cross-sectional view, the capacitor 106 placed at a distance d from the web of packaging material 102. In the scenario shown in FIG. 2a no distinctive feature is present under the capacitor, at position p. The distance d may be 2-5 mm. How close the capacitor 106 can be placed to the web of packaging material 102 may depend on how much the web vibrates. The distance d should be sufficiently large so that the web of packaging material 102 cannot touch the capacitor 106, since this may cause damage either to the capacitor 106 or to the web of packaging material 102. Further, the distance d should be sufficiently small so that the web of packaging material 102 is fed through a region where it affects the dielectric properties of the capacitor 106. The closer it is, the more clear the effect is.

The dielectric properties can be affected by the distance between the web of packaging material 102 and the capacitor 106. It may also be affected by the thickness of the web of material, since a volume of air is replaced by the same volume of packaging material and the packaging material has different dielectric properties than air.

Figure 2B:
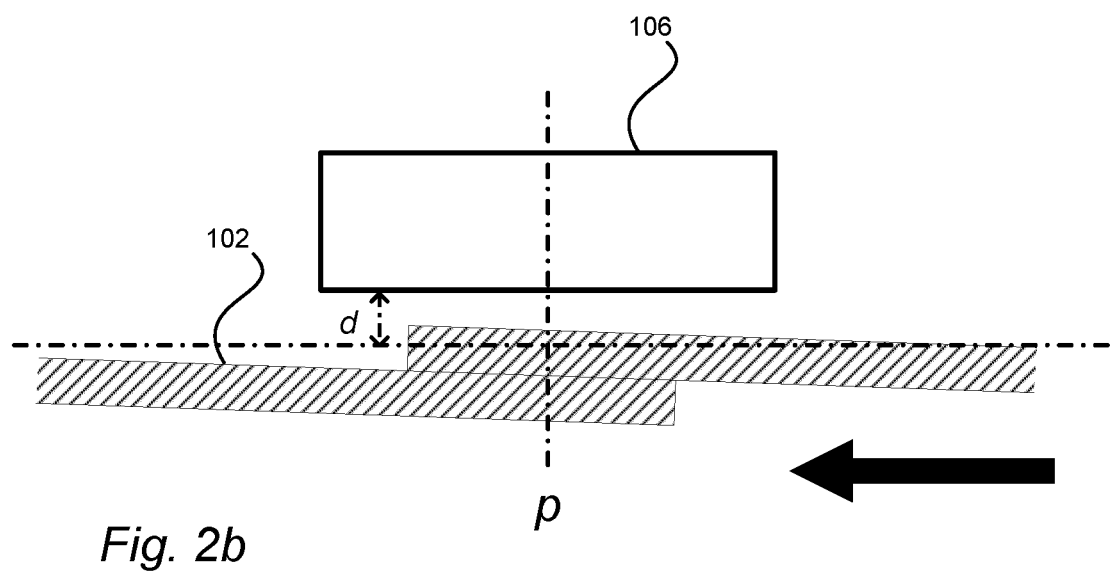

The distance d may also be dependent on the thickness of the packaging material as illustrated in FIG. 2b. FIG. 2b illustrates, in a cross-sectional view, the capacitor 106 placed at the same distance d as in FIG. 2a from the web of packaging material 102. In the scenario illustrated in FIG. 2b a feature, in the form of a splice, is present under the capacitor 106, at the position p. Due to how the splice is formed, a part of the web reaches closer to the capacitor 106 than the distance d.

Herein, the web of packaging material 102 is slightly tilted, compared to in FIG. 2a. The reason is due to how the splice is formed. When looking at a small region around the splice, this may be a more accurate illustration. Looking at the web of packaging material 102 at a distance, the web 102 is significantly parallel to the capacitor 106 as in FIG. 2a. How the splice is formed and how sections of the web placed next to the splice are affected depend on the packaging material.

The splice can be the junction between two independent reels of packaging material. Normal operation of packaging machines requires the creation of splices when one of the two reels in the Automatic Splicing Unit, ASU, is about to finish. Alternative, the splice can be a doctoring splice. Such a splice can be formed when a part of the web of packaging material has to be removed. The doctoring splice may then be formed to join the two ends created from removing a part of the web. Thus, the splice appears as a thicker part of the web of packaging material because of the junction between two ends. Measuring the capacitance of the scenario in FIG. 2b may yield a higher value than in the scenario in FIG. 2a, because of the thicker part of the web.

The increased thickness of the web of packaging material 102 at the splice, due to the overlapping packaging material, may result in the web of packaging material 102 passing the capacitor 106 at a smaller distance than the distance d. The thicker the packaging material is, the closer the web of packaging material 102 may come to the capacitor 106.

The dielectric properties may be affected by that the distance d is decreased due to the increased thickness caused by the splice, but also in that more packaging material is provided close to the first capacitor 106, i.e. two layers of packaging material are provided.

Figure 3A:
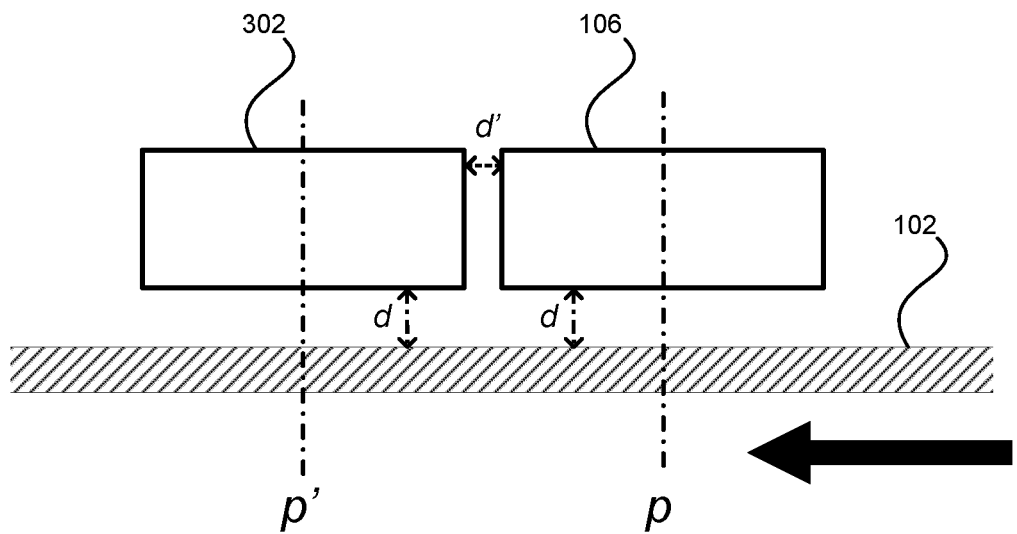
FIGS. 3a and 3b illustrates two different scenarios for two capacitors placed close to a web of packaging material.
Figure 3B:
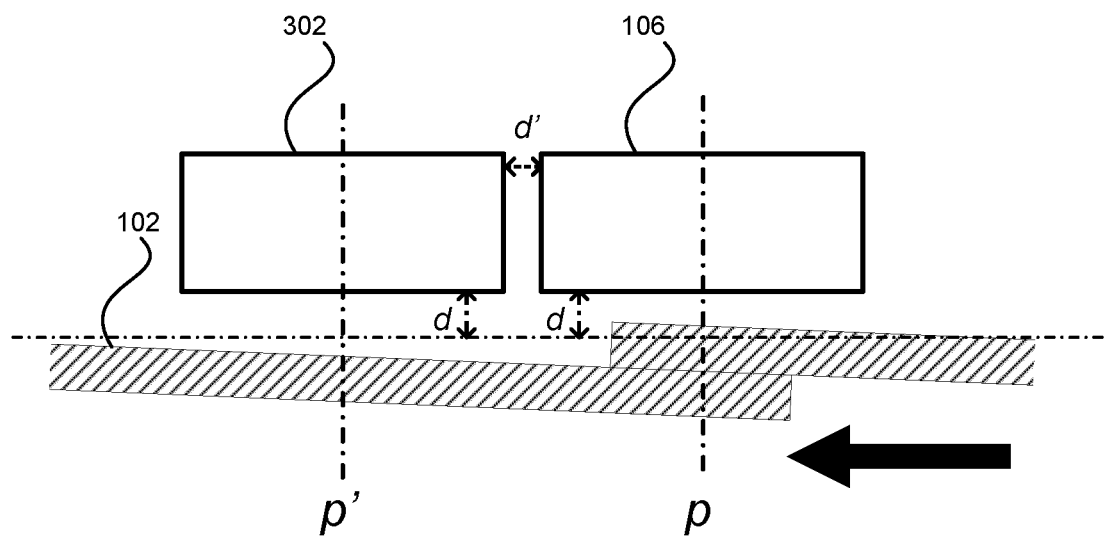

FIGS. 3a and 3b illustrates the two scenarios of FIGS. 2a and 2b respectively, but with a second capacitor 302 at position p' in addition to the first capacitor 106 at position p. The first and second capacitor 106, 302 are herein placed at the same distance d from the web of packaging material 102. Further, the first and second capacitor 106, 302 is placed at a separational distance d' from each other. The separational distance d' may be large enough so that a feature can affect the capacitance of either the first or second capacitor 106, 302 differently. As an effect, the differential capacitance may indicate the presence of a feature in a clear way. For instance, the separational distance d' may be 10 mm.

The feature may be detected either at position p, as illustrated herein, or at position p' when the feature has moved upstream.

Figure 4:
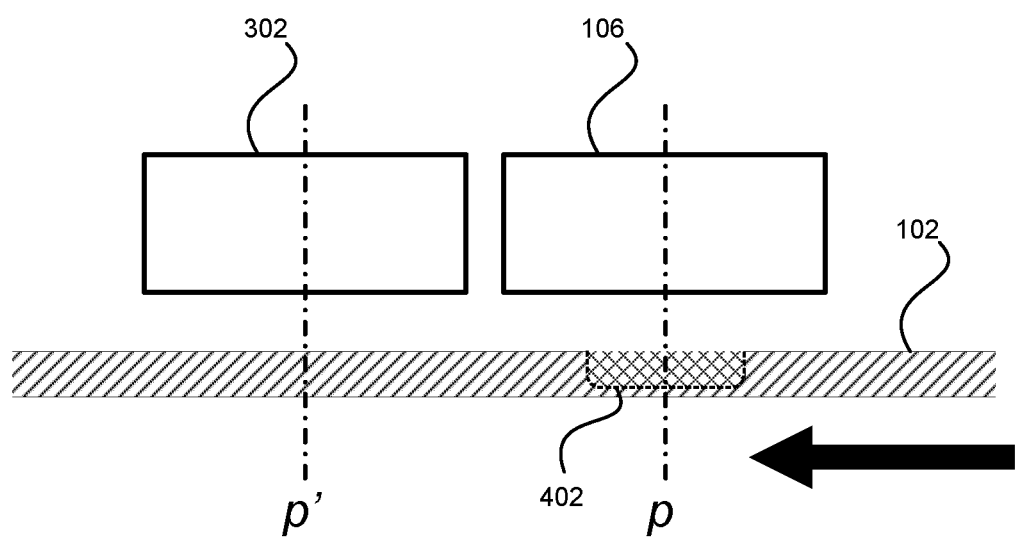
FIG. 4 illustrates a scenarios for two capacitors placed close to a web of packaging material.

FIG. 4 illustrates a different type of feature being detected by the first and second capacitor 106, 302. The feature can be an area 402 where material has been added to or removed from the web of packaging material 102. Herein the feature is illustrates as an area 402 where material has been removed. Such an area 402 may be a pre-laminated hole, PLH, i.e. an area in which a carton layer has been removed. The PLH may later be covered by a cap or other opening device Another alternative may be folding lines for folding the web 102 into a package. The folding lines, also sometimes referred to as weakening lines, may be areas in which the packaging material has been compressed. By having these areas, formed as lines, folding of the web can be facilitated and a risk of having unintentional folding can be reduced.

Figure 5:
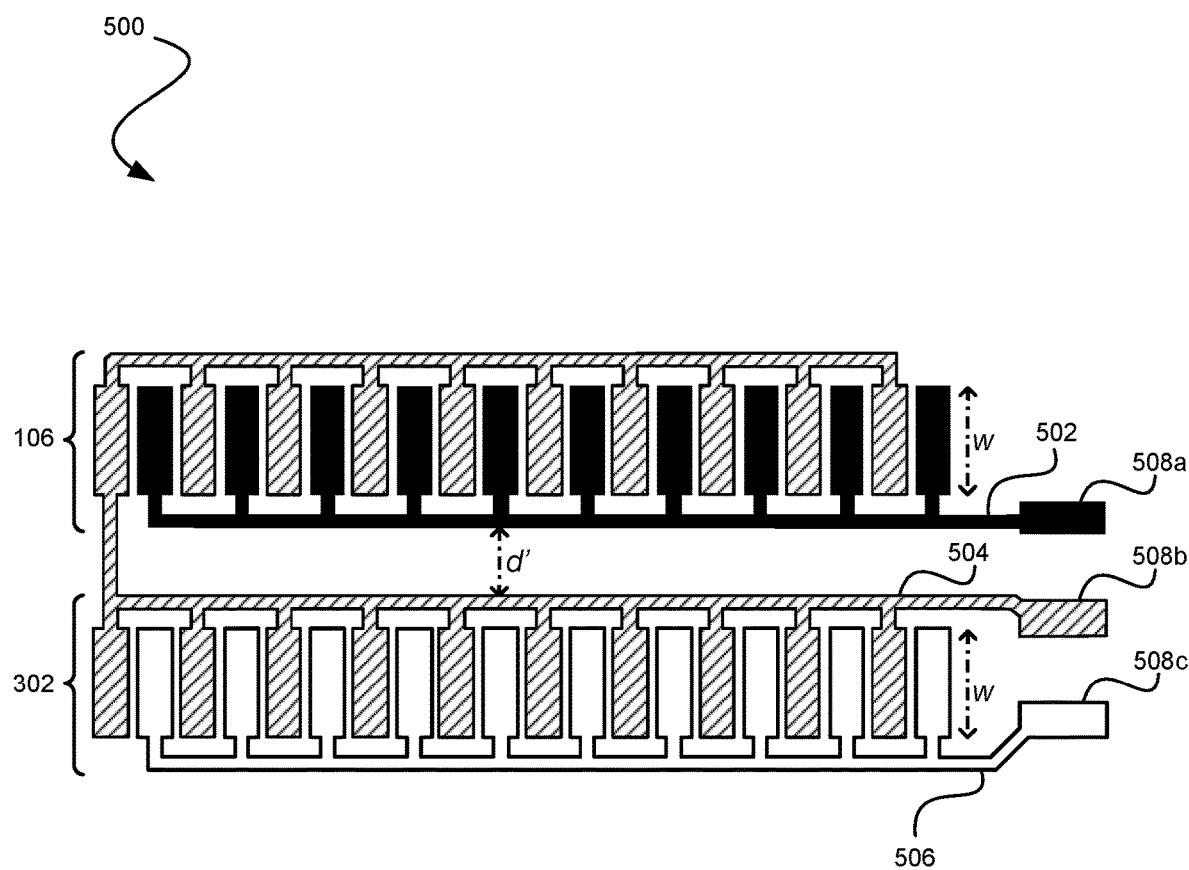
FIG. 5 illustrates an example of a pair of capacitors.

FIG. 5 illustrates, by way of example, an arrangement 500 comprising the first and the second capacitor 106, 302. The first and second capacitors 106, 302 are herein illustrated as interdigital planar capacitors. The plates of the interconnected capacitors may have a plurality of sub-plates. Even though illustrated with ten sub-plates each, the number of sub-plates may vary.

The physical form and construction of a general capacitor may vary widely. However, a typical capacitor has two plates forming two electrical conductors. The two plates are typically separated by a dielectric medium. In the proposed embodiment of FIG. 5, the first and second capacitor 106, 302 comprises a first and second plate respectively, that is connected to each other, thus forming a common plate 504. The first and second capacitor 106, 302 further comprises a third and fourth plate 502, 506 respectively, so that each capacitor comprises two plates separated by a dielectric medium.

The dielectric medium of the first and second capacitor 106, 302 can be formed by the volume of the surrounding air and material, such as the web of packaging material 102.

Alternatively, the common plate 504 may be separated into two plates, one for each capacitor 106, 302.

For low manufacturing costs and low complexity, the plates can be manufactured as a standard flexible printed circuit board, PCB.

The first and second capacitor 106, 302 may have a width w corresponding to a width of the feature to be detected, in order to maximize the variation in capacitance caused by the feature. As a non-limiting example, the width w may be 10-20 mm, or more preferably, 16 mm.

Each plate 502, 504, 506 may be provided with a excitation connector 508a-c, for connecting the capacitors to a source of electrical charges.

As previously mentioned, having two capacitors makes it possible to determine a differential capacitance. The change in capacitance when a feature is present can be in the range of femtofarads. Thus, removing noise by using the differential capacitance is advantageous, and it makes the method robust to common mode noise, varying distance between the capacitors and the web, movement of the web, different types of packaging material, support structure and roller.

Figure 6:
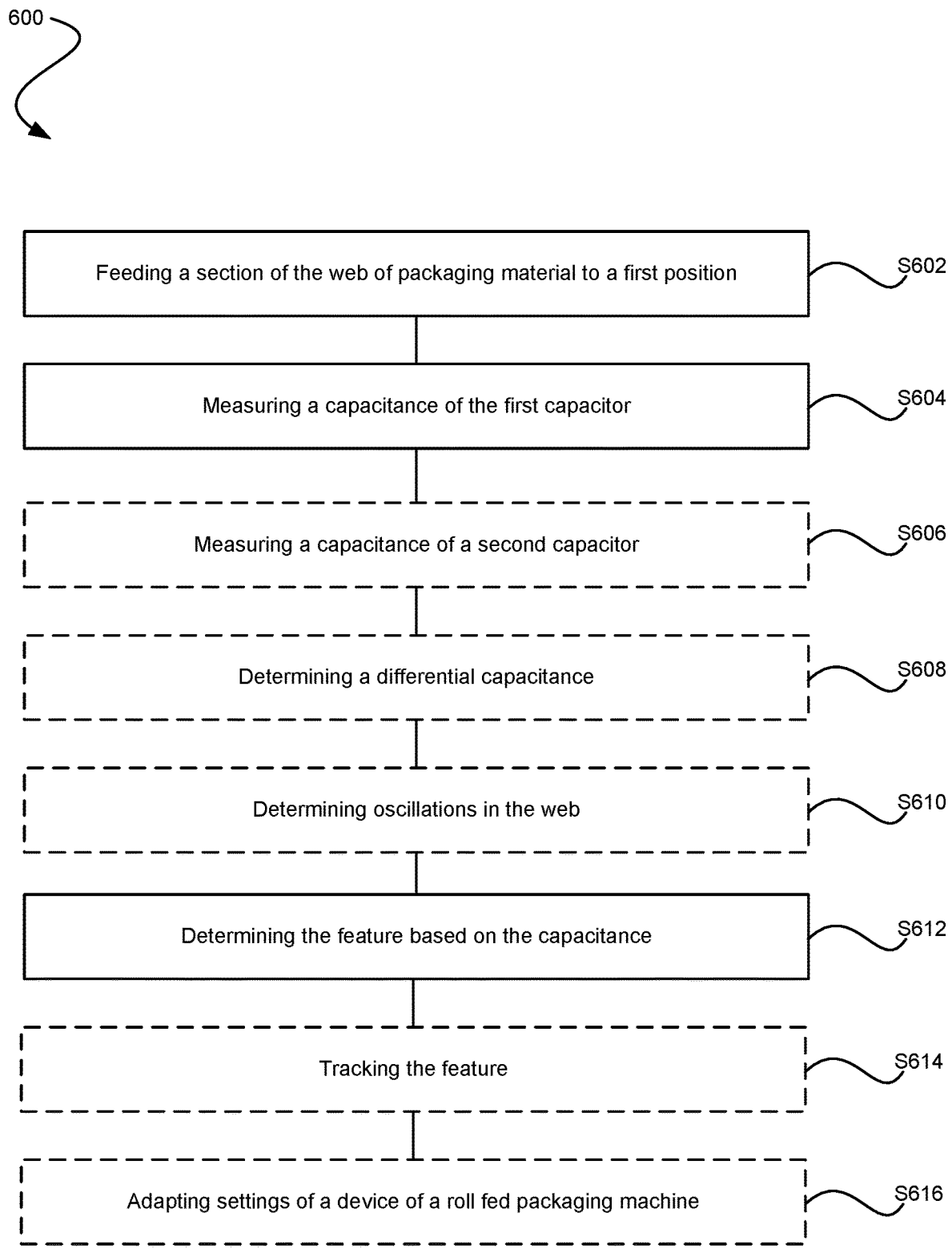
FIG. 6 is a flow-chart of a method for detecting and tracking a feature of a web of packaging material.

FIG. 6 is a flow-chart illustrating the steps of a method 600 for detecting and tracking a feature of a web of packaging material 102, using a first capacitor 106 placed at a distance d from the web of packaging material 102.

In a first step S602, a section of the web of packaging material 102 is fed to the first position p, so that the section influences the dielectric property of the first capacitor 106.

In a second step S604, a capacitance of the first capacitor 106 is measured at a point of time t.

In a third step S612, the feature of the section passing the first capacitor 106 at the point of time t is determined, based on the measured capacitance.

Optionally, in a fourth step S606, the capacitance of the second capacitor 302 may be measured at the point of time t at a second position p'. The second position p' may be located downstream the first position p. Put differently, the capacitance of the first and second capacitor 106, 302 are measured at the same point of time but on different sections of the web. Hence the two capacitors may experience different dielectric mediums.

Optionally, in a fifth step S608, a differential capacitance may be determined as a difference between the capacitance of the first capacitor 106, and the capacitance of the second capacitor 302.

The step of determining S612 the feature of the section passing the first capacitor 106 at the point of time t may be based on the differential capacitance.

The step of measuring S604 the capacitance may be performed with the first position p at a roller of a roll fed packaging machine.

Optionally, in a sixth step S614, the feature may be tracked, using the point of time t of the measurement.

Optionally, in a seventh step S616, settings of a device of a roll fed packaging machine may be adapted based on the presence of the feature.

Optionally, in an eighth step S610, oscillations in the web 102 affecting the distance d between the capacitor 106, 302 and the web 102 may be determined. The step of determining S608 the feature may be compensated for the determined oscillations.

Even though described in a certain order, the different steps may also be performed in other orders, as well as multiple times. For instance, the web of packaging material may be continuously fed past the capacitor, so that features can be detected in any section of the web. The method may be repeated at a subsequent point of time t' so that a feature can be detected at a subsequent section of the web. The subsequent section of the web may partly overlap with the previous section, depending on the speed of the web, and the length of the time interval between the previous and subsequent point of time.

Figure 7:
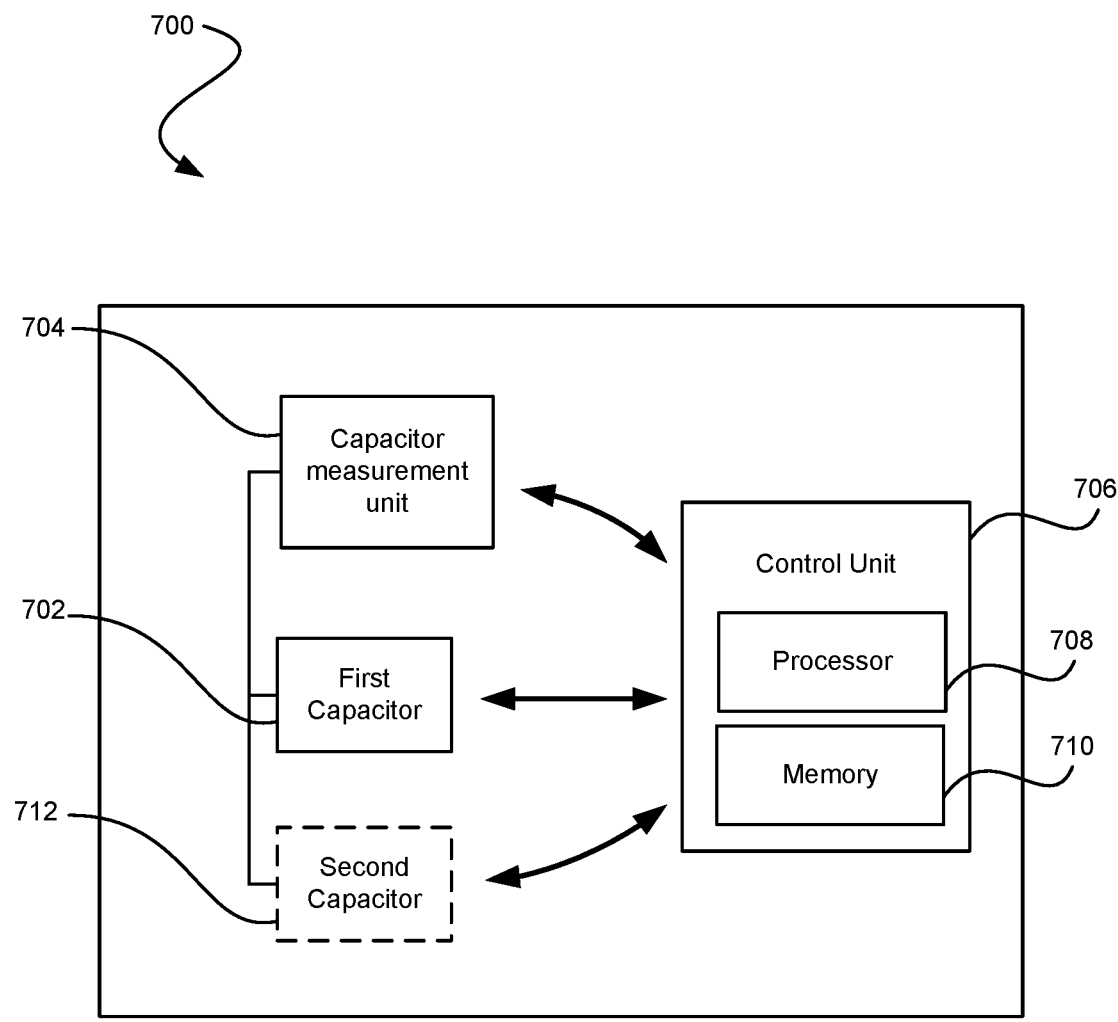
FIG. 7 is a schematic view of an arrangement for detecting and tracking a feature of a web of packaging material in a roll fed packaging machine.

FIG. 7 is a schematic view of an arrangement 700 for detecting and tracking a feature of a web of packaging material 102 in a roll fed packaging machine. The arrangement comprises a first capacitor 702, a capacitor measurement unit 704, a control unit 706 comprising a processor 708 and a memory 710, communicatively connected to the capacitor 702. The memory may hold instruction for the processor to execute. The control unit is configured to send a request to the capacitance measurement unit 704 to inject a known amount of charges to the first capacitor 702 placed at a distance d from the web of packaging material 102, receive indication that a section of the web of packaging material 102 has been fed to a first position p, so that the section influences a dielectric property of the first capacitor 702, measure, by the capacitor measurement unit 704, at a point of time t, a capacitance of the first capacitor 702, and determine the feature of the section passing the first capacitor 702 at the point of time t, based on the capacitance.

The arrangement 700 may further comprise a second capacitor 712. The control unit 706 may be further configured to measure, by the capacitor measurement unit 704, at the point of time t, a capacitance of the second capacitor 712 at a second position p', wherein the second position p' is located upstream from the first position p, determine a differential capacitance as a difference between the capacitance of the first capacitor 702, and the capacitance of the second capacitor 712, wherein the step of determining the feature of the section passing the first capacitor 702 at the point of time t, is based on the differential capacitance.

The arrangement may be provided as an update kit to a pre-existing roll fed packaging machine.

Figure 8:
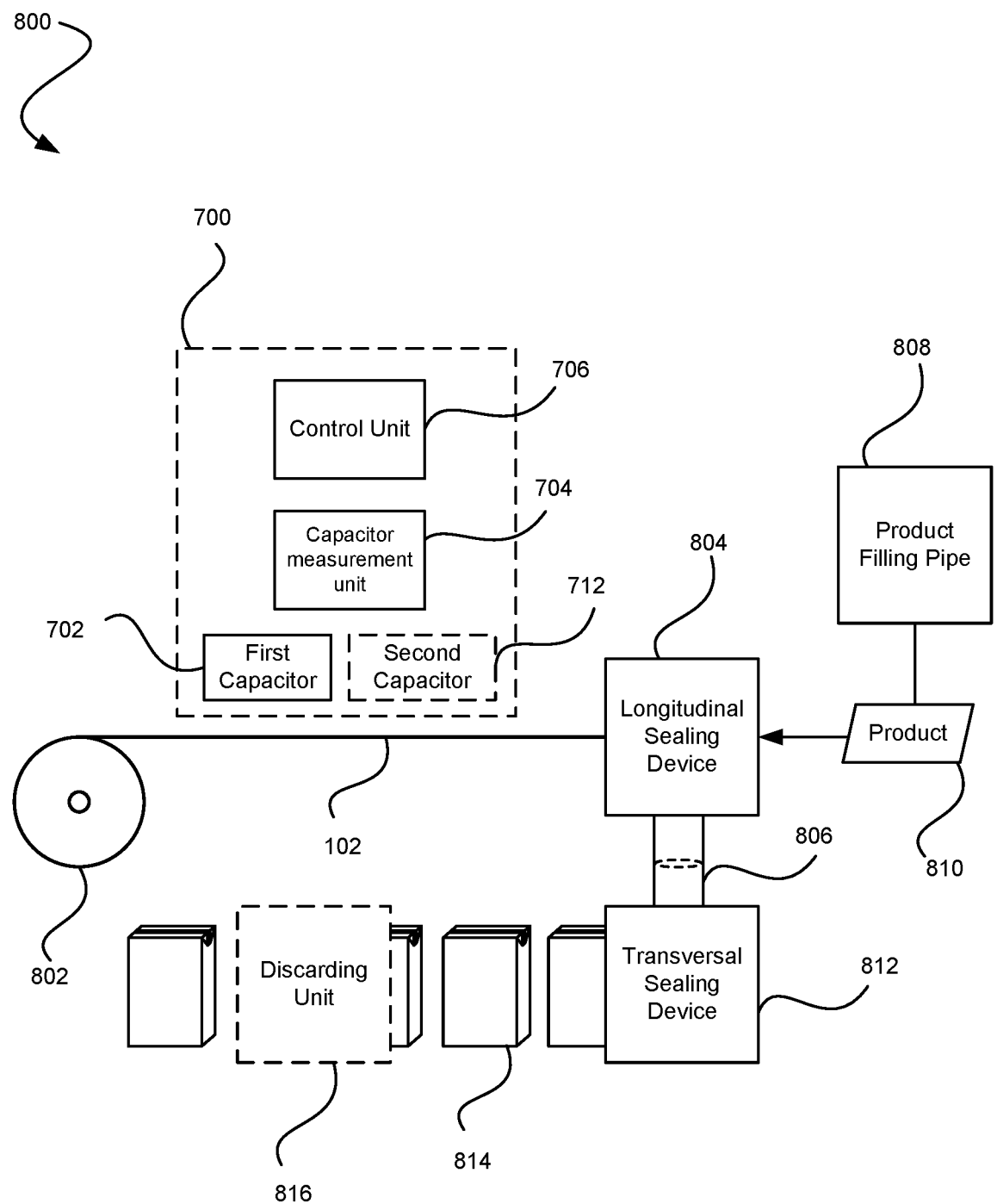
FIG. 8 is a schematic view of a roll fed packaging machine.

FIG. 8 is a schematic view of a roll-fed packaging machine 800. The roll fed packaging machine 800 is enabled for detecting and tracking the feature of a roll of packaging material 102. The roll fed packaging machine 800 can comprise a reel receiver 802 for receiving a reel of packaging material 102, a longitudinal sealing device 804 for forming a tube 806 of the web of packaging material 102, a product filling pipe 808 for filling product 810 into the tube 806, a transversal sealing device 812 for forming packages 814, filled with the product 810, from the tube 806, and an arrangement 700 for detecting and tracking a feature of a web of packaging material in a roll fed packaging machine, as described in connection to FIG. 7. The roll fed packaging machine 800 may be any common roll fed packaging machine provided with the arrangement 700. The arrangement may preferably be provided in connection with a roller of the packaging machine, as illustrated in FIG. 1.

The arrangement 700 may be installed as an integral part of the machine 800, but it may also be installed as an upgrade kit at a later point of time. Further, even though not illustrated, the arrangement 700 may be connected to a remote server such that program code of the arrangement can be updated if required, and also to provide for that reference data linked to features can be retrieved by the arrangement, thereby making it possible to update the arrangement 700 if e.g. a new type of packaging material is to be used. Further, having the arrangement 700 connected to the remote server, data can be collected and combined with similar data retrieved from other similar arrangements. By doing so, the reference data can be continuously improved by using e.g. ML or AI algorithms.

The roll fed packaging machine 800 may further comprise a discarding unit 816 for discarding certain packages. For instance, in case the ASU splice or the doctoring splice is detected in the web, this may be traced through the machine. The package formed from the web and that comprise the ASU splice or the doctoring splice may be discarded. To be on the safe side, a number of packages before and after this package may also be discarded. With an increased traceability made possible by the arrangement 700, a number of discarded packages may be reduced.

The control unit 706 may be communicatively connected to a control system of the roll fed packaging machine 800 such that the feature can be tracked throughout the roll-fed packaging machine 800. Further, the control system of the roll fed packaging machine 800 may be configured to adapt settings of one or more devices of the roll fed packaging machine 800 based on the feature being tracked. As an example, if a splice is present in a package, more power may be provided for the longitudinal sealing. Having two layers of packaging material instead of only one layer may namely require more power, i.e. additional heating, to provide for that a reliable sealing is made. Put differently, if the machine knows when the splice is present, it may alter settings of the longitudinal sealing device 804 to compensate for this. Further, packages 814 comprising the splice may have to be discarded due to food safety reasons. A common practice is to also discard one package before and one package after the package comprising the splice. Again, by tracking the splice, the discarding unit 816 can know what packages 814 to discard.

From the description above follows that, although various embodiments of the invention have been described and shown, the invention is not restricted thereto, but may also be embodied in other ways within the scope of the subject-matter defined in the following claims.

The invention claimed is:

1. A method for detecting and tracking a feature of a section of a web of packaging material, using a first capacitor placed at a distance from the web of packaging material, the method comprising:
    feeding the section of the web of packaging material to a first position, so that the section influences a dielectric property of the first capacitor;
    measuring, at a point of time, a capacitance of the first capacitor;
    determining the feature of the section passing the first capacitor at the point of time based on the capacitance;
    tracking the feature through a roll fed packaging machine using the point of time of the measurement; and
    adapting settings of a device of the roll fed packaging machine based on the feature.

2. The method according to claim 1, wherein the method further comprises:
    measuring, at the point of time, a capacitance of a second capacitor at a second position, wherein the second position is located downstream the first position; and
    determining a differential capacitance as a difference between the capacitance of the first capacitor and the capacitance of the second capacitor,
    wherein the step of determining the feature of the section passing the first capacitor at the point of time is based on the differential capacitance.

3. The method according to claim 2, wherein a first capacitor plate of the first capacitor is connected to a second capacitor plate of the second capacitor.

4. The method according to claim 1, wherein a roller of the roll fed packaging machine is placed opposite to the first capacitor and the step of measuring the capacitance is performed with the web being in contact with the roller.

5. The method according to claim 1, wherein the method further comprises:
    determining oscillations in the web affecting the distance between the first capacitor and the web; and compensating for the oscillations in the step of determining the feature.

6. The method according to claim 1, wherein the distance between the first capacitor and the web of packaging material is 2-5 mm.

7. The method according to claim 1, wherein the first capacitor is a planar capacitor.

8. The method according to claim 1, wherein the feature is related to a thickness of the web of packaging material.

9. The method according to claim 1, wherein the feature is a splice between two ends of the web of packaging material.

10. The method according to claim 1, wherein the feature is an area where material has been added to or removed from the web of packaging material.

11. An arrangement for detecting and tracking a feature of a section of a web of packaging material in a roll fed packaging machine, the arrangement comprising:
    a first capacitor;
    a capacitor measurement unit; and a control unit comprising a processor and a memory, the control unit being communicatively connected to the first capacitor, wherein the control unit is configured to:

send a request to the capacitor measurement unit to inject a known number of charges to the first capacitor placed at a distance from the web of packaging material, receive indication that the section of the web of packaging material has been fed to a first position, so that the section influences a dielectric property of the first capacitor, measure, by the capacitor measurement unit, at a point of time, a capacitance of the first capacitor, and determine the feature of the section passing the first capacitor at the point of time, based on the capacitance.

12. The arrangement of claim 11, further comprising a second capacitor, wherein the control unit is further configured to:

measure, by the capacitor measurement unit, at the point of time, a capacitance of the second capacitor at a second position, wherein the second position is located upstream from the first position, and determine a differential capacitance as a difference between the capacitance of the first capacitor and the capacitance of the second capacitor, wherein the step of determining the feature of the section passing the first capacitor at the point of time is based on the differential capacitance.

13. A roll fed packaging machine, comprising:

a reel receiver for receiving a roll of a web of packaging material;

a longitudinal sealing device for forming a tube of the web of packaging material;

a product filling pipe for filling product into the tube; a transversal sealing device for forming packages, filled with the product, from the tube; and an arrangement for detecting and tracking a feature of the web of packaging material in the roll fed packaging machine configured to perform the method of claim 1.

14. The roll fed packaging machine according to claim 13, wherein a control unit of the arrangement is communicatively connected to a control system of the roll fed packaging machine such that the feature is tracked throughout the roll fed packaging machine; and wherein the control system of the roll fed packaging machine is configured to adapt settings of one or more devices of the roll fed packaging machine based on the feature being tracked.

* * * * *